(12) United States Patent
Höpner et al.

(10) Patent No.: US 7,284,655 B2
(45) Date of Patent: Oct. 23, 2007

(54) METHOD AND ARRANGEMENT AS WELL AS APPARATUS FOR TRANSVERSE CONVEYANCE OF REAMS

(75) Inventors: Bernd Höpner, Pinneberg (DE); Wolfram Wolf, Bilsen (DE)

(73) Assignee: E.C.H. Will GmbH, Hamburg (DE)

( * ) Notice: Subject to any disclaimer, the term of this patent is extended or adjusted under 35 U.S.C. 154(b) by 258 days.

(21) Appl. No.: 11/043,450

(22) Filed: Jan. 27, 2005

(65) Prior Publication Data

US 2005/0167242 A1    Aug. 4, 2005

(30) Foreign Application Priority Data

Jan. 28, 2004   (EP)   ................... 04090025

(51) Int. Cl.
*B65G 37/00*   (2006.01)
(52) U.S. Cl. .............. 198/370.06; 198/370.1; 198/597; 198/601
(58) Field of Classification Search ........... 198/370.03, 198/370.06, 370.1, 433, 597, 601, 817; 209/695, 209/651, 654
See application file for complete search history.

(56) References Cited

U.S. PATENT DOCUMENTS

| | | | | |
|---|---|---|---|---|
| 3,515,254 A * | 6/1970 | Gary | | 198/502.2 |
| 4,730,718 A * | 3/1988 | Fazio et al. | | 198/370.1 |
| 4,962,841 A * | 10/1990 | Kloosterhouse | | 198/370.09 |
| 5,052,542 A * | 10/1991 | Wipf | | 198/370.08 |
| 5,400,895 A * | 3/1995 | Hollingsworth et al. | | 198/367 |
| 5,547,084 A * | 8/1996 | Okada et al. | | 209/583 |
| 5,609,236 A * | 3/1997 | Neukam | | 198/370.1 |
| 5,720,157 A * | 2/1998 | Ross | | 53/445 |
| 5,743,375 A * | 4/1998 | Shyr et al. | | 198/463.3 |
| 5,868,238 A * | 2/1999 | Bonnet | | 198/370.1 |
| 5,984,078 A * | 11/1999 | Bonnet | | 198/370.1 |
| 6,189,702 B1 * | 2/2001 | Bonnet | | 209/651 |
| 6,220,421 B1 * | 4/2001 | Hugon et al. | | 198/370.07 |
| 6,236,008 B1 * | 5/2001 | Bonnet | | 209/583 |
| 6,264,042 B1 * | 7/2001 | Cossey et al. | | 209/559 |
| 6,323,452 B1 * | 11/2001 | Bonnet | | 209/583 |

(Continued)

FOREIGN PATENT DOCUMENTS

DE        297 05 548 U        5/1997

*Primary Examiner*—Douglas A Hess
(74) *Attorney, Agent, or Firm*—Venable, LLP; Robert Kinberg; Marina V. Zalevsky

(57) ABSTRACT

The invention relates to a method, an arrangement and an apparatus for conveying objects transversely to their incoming transport direction. In known apparatuses there is a possibility of either removing all the objects in one direction or the other. To a limited extent known apparatuses also allow a division of a string formed from several objects. However, a disadvantage is that the distribution of the objects, in other words the division of a string formed from several objects, e.g. a ream string formed from fourteen reams, to packing machines located opposite one another is possible only to a limited extent. It can also take place only when the machine has been shut down. In that the division of the string for conveying away the objects to the apparatuses for further processing takes place during continuous operation of the production machine, process-optimized production is guaranteed, the apparatus characterized in that at least two conveying means drivable independently of one another are provided, which can be brought into contact with the objects partially or in sections, as a component of the arrangement being particularly good for carrying out the method.

23 Claims, 3 Drawing Sheets

U.S. PATENT DOCUMENTS 6,343,685 B1    2/2002  Hofer
6,460,681 B1 * 10/2002  Coutant et al. ........ 198/370.04
6,688,459 B1 *  2/2004  Bonham et al. ............ 198/617
7,040,477 B2 *  5/2006  Brixius et al. ......... 198/370.08

* cited by examiner

METHOD AND ARRANGEMENT AS WELL AS APPARATUS FOR TRANSVERSE CONVEYANCE OF REAMS

CROSS-REFERENCE TO RELATED APPLICATION

This application claims the priority of European Patent Application No. 04 09 0025.0 filed Jan. 28, 2004, the subject matter of which is incorporated herein by reference.

BACKGROUND OF THE INVENTION

The invention relates to a method for conveying objects from a conveying means to at least two apparatuses for further processing of the objects, comprising the steps: cyclic feeding of a string, formed from several objects arranged side by side and produced in a production machine, on to the conveying means, dividing the string into at least two partial strings and removal of the partial strings to the apparatuses for further processing of the objects by the conveying means. Furthermore, the invention relates to an arrangement for conveying objects from a production machine to apparatuses for further processing of the objects, essentially comprising a production machine for producing the objects, a conveying means for removing a string formed from the objects to the apparatuses for further processing and at least two apparatuses for further processing of the objects, the conveying means being constructed in such a way that the string positioned on the conveying means can be divided, so that partial strings can be conveyed to different apparatuses for further processing, and an apparatus for conveying objects transversely to their incoming transport direction, essentially comprising a support element clamping a transport plane for depositing the objects and also conveying means extending over the entire deposit width of the objects with a transport area and a return area for simultaneous removal of the objects in the removal direction, the conveying means being arranged in an idle position underneath the support element and able to be brought into contact with the objects for transport purposes only.

Known methods, arrangements and apparatuses of this kind serve, e.g. in the paper industry for transporting stacked leaves, sheets, or the like made of cardboard, paper, plastics material or other stackable materials from a collecting station arranged downstream of a production machine to packing machines or the like.

Inside a normally multi-copy production machine, so-called reams of paper are continuously formed in the form of layers of leaves or stacks of leaves by longitudinal and/or transverse cutting of lengths of material, e.g. lengths of paper. Several reams of paper lying closely side by side form a ream row, also designated below as a ream string. This ream string is deposited in a collecting station. By suitable means, advantageously a system of tongs, the ream string is pulled on to an apparatus for conveying the ream transversely to its incoming transport direction, or placed on said apparatus. A ream string consists of at least two reams, but can be extended by many times this. However, each ream string is generally further processed, namely preferably packaged. The individual apparatuses, e.g. the production machine and the packing machines, are therefore geared to one another with their respective capacities. Normally a 14-copy production machine, for example, produces more reams than an individual packing machine can take off. In order to increase the productivity of production lines of this kind, in other words to adapt the take off to the production, packing machines are arranged preferably on both sides of the production machine or the collecting station. As a rule both packing machines are supplied evenly with reams.

For practical feeding, in particular dependent on assignments, of the reams to the two packing machines the ream string is divided. The dividing of the ream string can be achieved by different configurations of the conveying means. By division of the ream string a first partial string is conducted to a first packing machine and a second partial string to the second packing machine, the packing machines preferably being arranged on opposite sides of the conveying means. In this way, it is achieved on the one hand that different assignments, e.g. if one part of the reams is packed in blue cover paper, while another part is packed in red cover paper, can be finished off in parallel. On the other hand, the reams are quickly conducted out of the production machine or the conveying means.

In known methods and arrangements the division of the string is done by means of manual settings on the conveying means. However, setting can take place only when the machine is shut down and is normally done before the start of the respective assignments. The known methods have the disadvantage that because the machine is shut down the efficiency of the overall arrangement drops. Additionally, breakdowns or failures of individual components of a packing machine, for example, can be only partially compensated for. This means that the production quantity lost to a packing machine owing to a breakdown can be subsequently compensated for only to a limited extent. However, this results in the assignment for one packing machine being able to be met, whilst the other packing machine is still finishing off its assignment, so that the packing machines have met their assignments at different times.

Furthermore, apparatuses are known in which, in an example case in which a ream string is formed from fourteen reams, in other words, e.g. comprises stacks formed from fourteen copies/piles with 500 leaves of paper of format DIN A4, the ream string is divided evenly, so that the apparatus for conveying the reams removes seven reams in each case transversely to their incoming transport direction on both sides. For this purpose the known apparatus is divided in the area of a parting line, so that conveying of a number of reams on each side is guaranteed. This parting line is displaceable in order to enable unequal supply to the packing machines arranged on both sides, e.g. in the event that one of the packing machines has been shut down owing to a defect or because the packing machines are to be differently loaded. Apparatuses of this kind have the disadvantage, however, that, conditional on structure, only a small travel path is available, so that dividing the reams of a ream string is possible only to a limited extent.

In another known apparatus of the generic kind a first conveying line is provided which is suitable for removal in one direction or the other. However, in order to enable an even supply to the packing machines arranged on both sides of the apparatus, in particular in the event that the production machine is more efficient than one single packing machine, an additional apparatus is required, by means of which a complete ream string can be transferred to another, second conveying line. This apparatus is, on the one hand, very complex to construct and has a very large constructional form in width and length. On the other hand, division of a ream string is not possible, so that the ream string can be transported in its entire length either to one side or the other, only.

SUMMARY OF THE INVENTION

It is therefore the object of the present invention to propose a method which enables process-optimised production. Furthermore, it is the object of the present invention to create an arrangement which is suitable for enabling process-optimised production. A further object of the invention is to create a structurally simple and compact apparatus which guarantees variable removal of the transported-in ream strings to following packing machines.

This object is achieved by a method of the kind initially mentioned, in that dividing of the string into the partial strings for conveying away the objects to the apparatuses for further processing takes place during continuous operation of the production machine and the partial strings are removed simultaneously in opposite directions to one another. In this way specific process optimisation is achieved, as the packing machines can be supplied with different string lengths during operation, in other words on-line. If, for example, one packing machine fails briefly, during this failure time the other packing machine is supplied with a larger number of objects, in order to be able to finish off the assignment. As soon as the failed packing machine is in operation again the string is divided in such a way that the previously failed packing machine is supplied with a larger number of objects to make up the deficit. In the end, both assignments can then be completed at the same time.

Furthermore, the object is achieved by an arrangement with the features initially mentioned, in that means are additionally provided for dividing the string during operation of the production machine and simultaneous removal of the partial strings in the opposite direction. With this arrangement individual distribution or division of the string is guaranteed, so that assignments can be completed simultaneously, irrespective of breakdowns or the like. The configuration according to the invention further enables very accurate control of the packing machines, so that even different sizes of assignments can be carried out process-optimised on the two packing machines.

The object is also achieved by an apparatus of the kind initially mentioned in that at least two conveying means drivable independently of one another are provided, which can be brought into contact with the objects partially or in sections. This makes any division of a ream string to be removed possible in a particularly simple and easy-to-operate way. The conveying means which are drivable independently of one another ensure that simultaneous removal of the objects can take place in both removal directions. As contact of the conveying means with the objects is provided partially or in sections, any division of the ream string is possible. Using the example of a ream string consisting of ten reams, this means that, e.g. one ream can be removed to the right and nine reams to the left simultaneously, in that one of the conveying means is brought into contact with nine reams and the other conveying means with only one. In that the conveying means are drivable independently of one another, one conveying means can be driven to the left while the other conveying means is driven to the right. By means of the invention it is thereby possible for the first time to supply packing machines with objects individually according to load, specific assignment, availability or the like.

Advantageously, contact elements are arranged underneath the transport area of the conveying elements for lifting the conveying elements upwards out of the transport plane. In this way, the production of a selective and partial functional connection between the conveying elements and the objects is possible particularly easily.

In a further preferred embodiment of the invention the conveying elements are segmented, the number of segments in the transport area of the conveying means or the conveying elements corresponding at least to the number of objects to be transported. The segmenting is a purely imaginary division of the transport area. This means that the conveying means or the conveying elements are constructed in such a way that they can be moved out of the transport plane at at least ten positions. In other words, at least ten means for lifting the conveying elements must be provided. This enables selective production of a functional connection between the conveying means and the objects.

Several, preferably four, contact elements are preferably allocated to each segment or each object of a string. This guarantees optimum and exact triggering of the conveying elements, so that the conveying elements are also lifted only at exactly the desired positions. The lifting of the conveying elements in one segment, in other words underneath one object, leaves the adjacent objects unaffected.

BRIEF DESCRIPTION OF THE DRAWINGS

Further advantageous and preferred features and embodiments of the arrangement and the apparatus and advantageous method steps emerge from the subordinate claims and the description. A particularly preferred embodiment of an apparatus and also the basic principle of the method are explained in greater detail using the drawings.

DETAILED DESCRIPTION OF THE INVENTION

The apparatus shown and described serves to convey stacks consisting of sheets of paper or the like transversely to their incoming transport direction. The apparatus can, however, also be used for conveying other objects.

Figure 1:
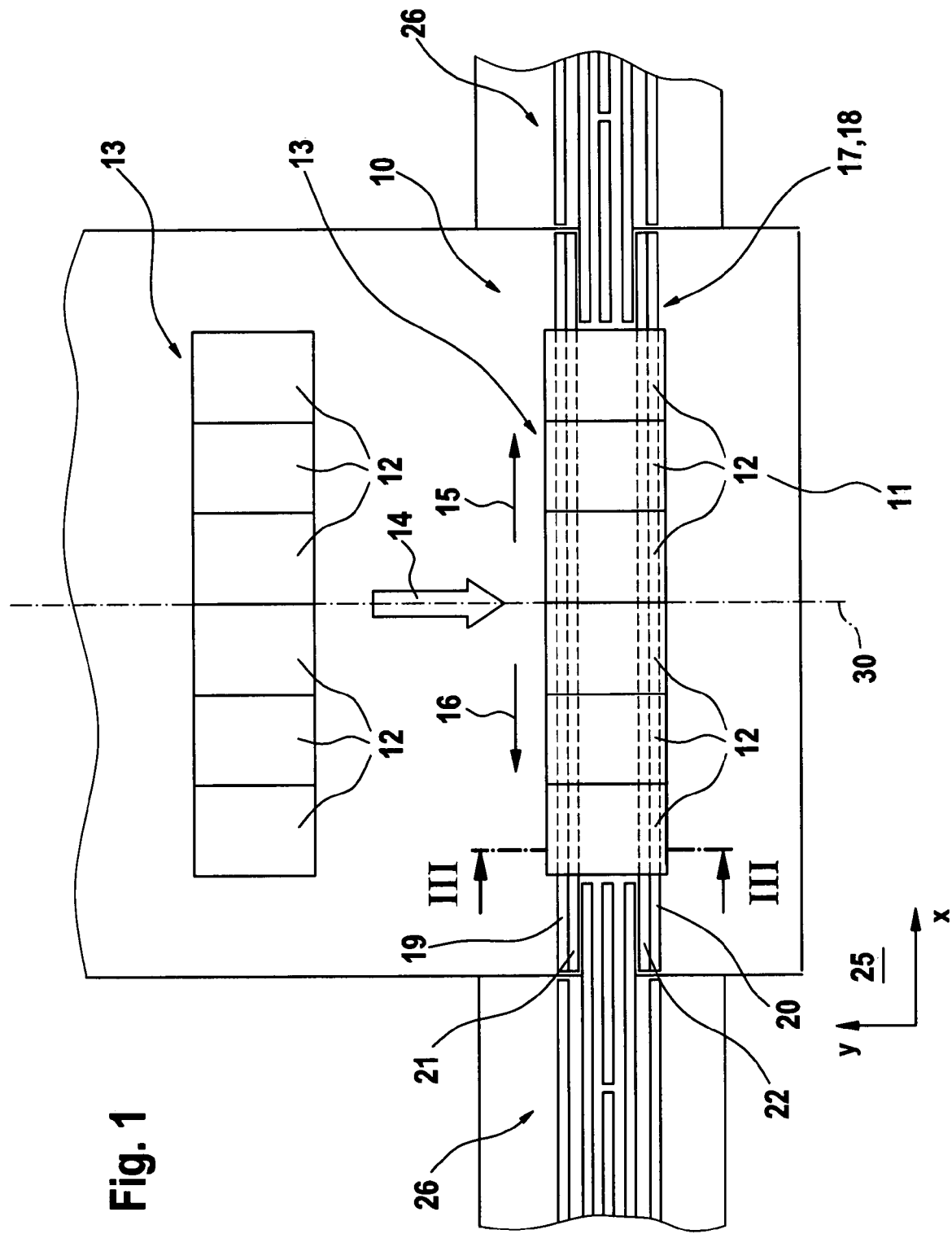
FIG. 1 shows a plan view on to the apparatus with six reams of paper deposited on the support element or the conveying means.

In FIG. 1 an apparatus 10 is shown which serves as connecting member between a production machine (not illustrated) and two packing machines (likewise not illustrated). The apparatus 10 makes up an arrangement together with the production machine and the packing machines.

The apparatus 10 comprises a support element 11, which can be constructed, e.g. as a so-called air conveyor table (floating table). The support element 11 serves for the deposit of a ream string 13, usually formed from several reams 12. In the embodiment shown the ream string 13 is formed from six reams 12. The ream string 13 can, however, be formed from a smaller or larger number of reams 12.

The apparatus 10 is constructed in such a way that the number of reams 12 to be transported from the incoming transport direction (see arrow 14 in FIG. 1) to the left side (see arrow 15) or to the right side (see arrow 16) is variable. The apparatus 10 has for this purpose two conveying means 17 and 18. The conveying means 17, 18 are drivable separately, this being via drives (not illustrated). In the embodiment according to FIG. 1 each conveying means 17, 18 has two conveying elements 19, 20 or 21, 22. The conveying elements 19, 20 and 21, 22 are arranged parallel to one another and extend practically over the entire width of the support element 11. The conveying elements 19 to 22 are constructed as continuous, circulating conveyor belts or the like. The conveying elements have a transport area 23 on the (upper) side facing the reams 12 and a return area 24 on the (lower) side facing away from the reams 12.

The transport area 23 of all the conveying elements 19 to 22 is located in an initial position or idle position of the apparatus 10 underneath the transport plane 25 clamped by the support element 11. In other words, the conveying elements 19 to 22 with their transport area 23 are each arranged preferably minimally lower than the support element 11, in such a way that the reams 12 in the idle state lie directly on top of the support element 11 when the reams 12 or the ream string 13 is/are deposited on the apparatus 10.

The conveying elements 19 to 22, drivable in both directions, all run parallel to one another. In the embodiment described conveying element 19 of conveying means 17 and conveying element 21 of conveying means 18, on the one hand, and conveying element 20 of conveying means 17 and conveying element 22 of conveying means 18, on the other hand, are arranged respectively in pairs, the pairs being arranged at a distance from one another. Conveying elements 19 and 20 are arranged located on the outside and conveying elements 21, 22 on the inside. Any other suitable arrangement of the conveying elements 19 to 22 to one another is likewise provided, however. For example, one conveying means may have two conveying elements, while the other conveying means has only one conveying element. In a case of this kind the single conveying element of one of the conveying means would preferably be arranged between the two conveying elements of the other conveying means.

The two conveying elements 19, 20 of conveying means 17 or conveying elements 21, 22 of conveying means 18 are respectively drivable by means of a drive (not illustrated), the drive direction being variable. Alternatively, each conveying element 19, 20, 21, 22 can also have a separate drive. In this case, though, the drives are synchronised related to one conveying means 17 or 18 preferably via suitable and customary means in such a way that conveying elements 19, 20 on the one hand and conveying elements 21, 22 on the other hand can be or are driven respectively in the same direction and at the same speed.

For smooth transfer of the reams 12 to the packing machine arranged downstream suitable conveying means 26 project at least partially into the transport area 23 of the conveying means 17, 18. The conveying means 26 are preferably located between the pairs formed by the conveying elements 19 to 22 and are arranged in the same plane.

For removing the reams 12 from the support element 1 the conveying elements 19 to 22 can be brought out of the lower idle position into an upper transport position. For this purpose the support element 11 is constructed as divided, so that the conveying elements 19 to 22 can be moved through the support element 11. In the transport position the conveying elements 19 to 22 are in contact with the reams 12. In other words the conveying elements 19 to 22 in the transport position are minimally above the transport plane 25 or the support element 11. In order to bring the conveying elements 19 to 22 from the idle position into the transport position, contact elements 27 are arranged underneath the transport area 23 of the conveying elements 19 to 22. The contact elements 27 are constructed to be movable up and down perpendicular to the transport plane 25 and have a sliding piece 28 and also a pressure cylinder 29 or the like.

The number of contact elements 27 is variable. However, there are preferably four contact elements 27 arranged underneath each ream 12. Each of these four contact elements 27 arranged underneath a ream 12 is allocated to one of the conveying elements 19 to 22. Basically the contact elements 27 are triggerable separately. However, the contact elements 27 allocated to conveying elements 19, 20 of conveying means 17 and those allocated to conveying elements 21, 22 of conveying means 18 are preferably synchronously triggerable and actuatable.

With the contact elements 27 the conveying elements 19 to 22 are partially, in other words by segments, movable out of the plane 25 in the direction of the reams 12, so the reams 12 in the transport position from now on lie on the conveying elements 19 and 20 or 21 and 22. The conveying elements 19 to 22 are for this purpose divided into segments or sections, each section corresponding to approximately the width of an object. The number of segments or sections corresponds to at least the number of objects to be removed. In each segment, in other words, underneath each object, four contact elements 27 are arranged in succession in the incoming transport direction according to arrow 14. Normally there are always only two contact elements 27 allocated to the same conveying means 17 or 18 in the transport position, so that removal is done by one conveying means 17 or 18. At the same time the other two contact elements 27 of the segment are in the idle position. However, it is also conceivable for all the contact elements 27 of one segment to be in the transport position. This presupposes, though, that only one removal direction is provided.

Figure 2:
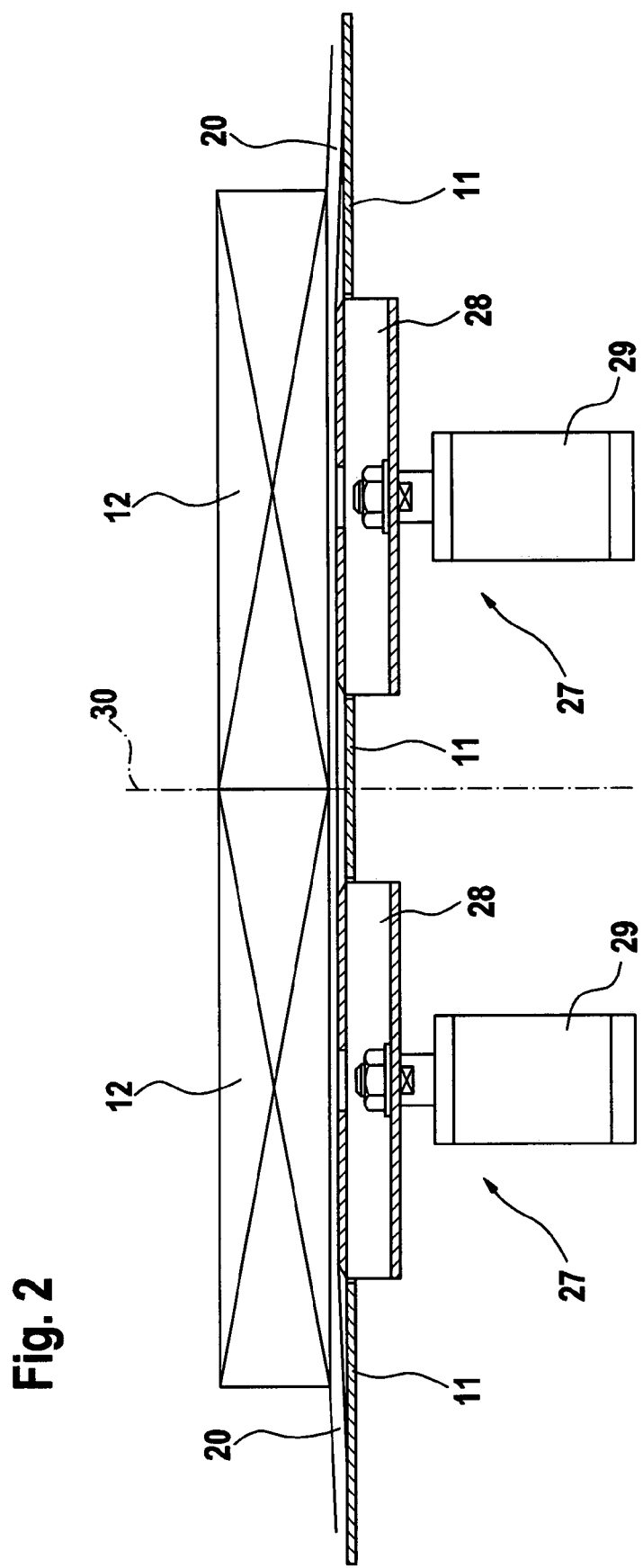
FIG. 2 shows a front view of a detail of the apparatus, namely two reams of paper opposite one another in the area of a parting line, which are in functional connection with the conveying elements.
Figure 3:
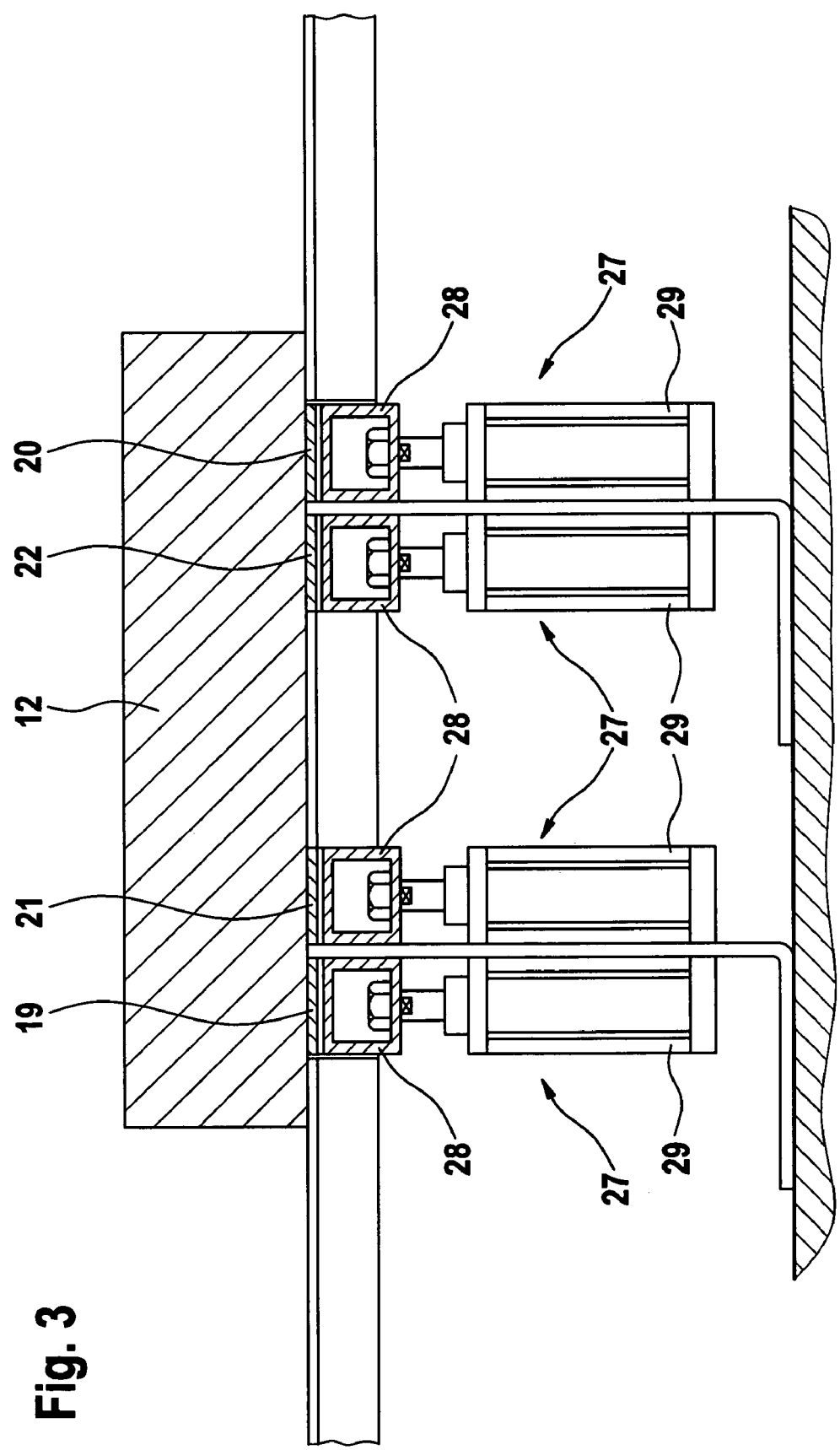
FIG. 3 shows a side view of the apparatus according to FIG. 1 in the section III-III.

The width of the sliding pieces 28 in the x-direction is smaller than the width of the reams 12 in the x-direction (see e.g. FIG. 2). The length of the sliding pieces 28 in the y-direction corresponds at a maximum the width of the conveying elements 19 to 22 in the y-direction (see e.g. FIG. 3). By selecting the dimensions of the sliding pieces 28 in the x- and y-directions it is ensured on the one hand that each sliding piece 28 also comes into contact with only one conveying element 19 to 22. On the other hand overlapping of the conveying element 19 to 22 in the area of adjacent reams 12 is prevented. In other words, the lifting of one ream 12 by the contact elements 27 located underneath it does not affect the adjacent reams 12.

The apparatus 10 also serves for transverse conveyance of any other objects and is not confined to the removal of reams 12. In embodiments not illustrated each conveying means 17, 18 may also have more than two conveying elements. The conveying elements can also be constructed as toothed belts or the like. The conveying elements may also be provided only partially, i.e. extend over only part of the width of the support element 11.

Various method sequences are explained in greater detail below.

Function—Left-Conveying Only

A ream string 13 is taken out of the production machine and placed on the support element 11. The conveying elements 19 to 22 are in the idle position, in other words underneath the transport plane 25. In the event that one-sided removal of all the reams 12, namely of the entire ream string 13, is to take place to the left in the direction of arrow 15, all the contact elements 27 are brought into the transport position, in that the sliding pieces 28 are moved upwards by means of the pressure cylinders 29, until the conveying elements 19 to 22 stand out from the transport plane 25. This gives rise to a small lift of preferably approximately 3 mm by which the ream string 13 is lifted from the support element 11. After all the contact elements 27 in all the segments, in other words underneath all the reams 12, have been moved upwards into the transport position and therefore the conveying elements 19 to 22 are in functional connection with the reams 12, the function "remove ream string" takes place, in that the conveying elements 19 to 22 are started equally aligned and at the same speed to the left in the direction of arrow 15.

Function—Right-Conveying Only

This functional principle corresponds identically to the functional principle just described with the difference that the movement or removal direction of the conveying elements 19 to 22 takes place in the direction of arrow 16.

Function—Symmetrical Division

In symmetrical removal of the reams 12 the ream string 13 is divided in the area of a parting line 30. For the three reams 12 to be removed to the left in the direction of arrow 15 (applies to the embodiment shown) only two of the four contact elements 27 of a segment are moved into the transport position, these being the contact elements 27 allocated to conveying elements 21 and 22. For the three reams 12 to be removed to the right in the direction of arrow 16 the contact elements 27 allocated to conveying elements 19 and 20 are moved into the transport position. For removal of the ream string 13, conveying elements 21 and 22 are now driven to the left, while conveying elements 19 and 20 are driven to the right.

Function—Asymmetrical Division

The asymmetrical division of the ream string 13 is explained using a division of 1:5. Underneath five reams 12 two contact elements 27 in each case are activated underneath conveying elements 21 and 22, i.e. moved upwards. Underneath the one remaining ream 12 the contact elements 27 underneath conveying elements 19 and 29 are activated. If conveying elements 19 and 20 are now driven to the right in arrow direction 16 and conveying elements 21, 22 to the left in arrow direction 15, removal of the ream string 13 takes place in a different direction.

The division is fully variable and not confined to that described. Even with a ream string 13 consisting of e.g. fourteen reams 12 a division of 0:14 to 14:0 is possible in all conceivable variations.

The basic principle of control of the division of the string 13 is explained in greater detail below. The previously described apparatus 10 as part of the arrangement is particularly suitable for carrying out the method, for which reason reference is made in describing the method to FIGS. 1 to 3. However, it is expressly pointed out that the method can also be carried out with other customary apparatuses, in particular conveying means. The method can be automatically controlled and/or regulated by individual, manually actuatable switching elements and/or by machine control units allocated to the arrangement in any case and/or separate control systems or units.

A production machine, not illustrated, namely a format cutter, produces several, in the embodiment shown according to FIG. 1 this being six reams 12, which form the string 13. The string 13 is conveyed by elements, not shown, preferably a tongs element or the like, on to the apparatus 10 for transport of the reams 12 to apparatuses arranged at the side (and not illustrated) for further processing, namely in particular packing machines, and there deposited in cycles. Each string 13 is divided up depending on the customer, the assignment or the requirement, in such a way that each packing machine contains a partial string for handling the assignment.

For example, the format cutter produces six reams 12 of paper with a weight of 90 g per sheet. A first assignment on one of the packing machines is to be given a blue packing means, namely blue external packaging and another assignment on the second packing machine red external packaging. The assignments for the two packing machines are the same size, namely in each case two hundred reams 12. In operation without breakdowns the string 13 is therefore normally symmetrically divided, so that both packing machines are fed three reams 12 from each string 13, respectively. The assignments on both packing machines are then completed at the same time. The division of each string 13 can, however, vary from cycle to cycle. In the event that, for example, the packing machine with the blue external packaging has a breakdown, the division of the string is automatically changed by suitable control means, for example a production control system, during operation of the production machine, either when the string 13 is located on the device or shortly before the string 13 is deposited on the apparatus 10. Control can be done by the packing machine itself or other—also external—systems.

During the breakdown of the packing machine for the blue external packaging all six reams 12 are fed to the other packing machine for the red external packaging, sometimes at a reduced feed speed through the production machine. If the breakdown lasts, e.g. four cycles, the packing machine for the red external packaging in this time receives twenty-four reams 12, while the packing machine for the blue external packaging receives no reams 12. As soon as the breakdown on the packing machine for the blue external packaging has been eliminated it is taken into operation again. In order to make up the backlog in meeting the assignment, the division of the string 13 is changed again on-line. In this way, e.g. a division of 4:2, in other words four reams 12 to the "blue" packing machine and two reams 12 to the "red" packing machine can be chosen. In this way both packing machines are always in operation. After a further twelve cycles the backlog has been made up, without the production machine having to be stopped, so the division is then adjusted again on-line to a, e.g. symmetrical, distribution. The assignments are then handled at the same time in spite of the breakdown of one packing machine.

If the size of the assignment is e.g. unequal, yet completion at the same time is still desired, the division of the strings 13 can also be variable from cycle to cycle. In that in each cycle the division can be changed on-line, individual control of the packing machines, accurate to the ream, is possible. In this way interruptions, e.g. for changing the type of paper, can be minimised, as the previously finished assignments can be handled at the same time. Changes of packing means, in other words, e.g. the change of external packaging on one of the packing machines, can also be compensated for. The method according to the invention accordingly enables control of the packing machines, accurate to the ream, even in apparatuses which enable only a limited gradation of the division of the string 13, in that with each cycle a different division of the string 13 can be chosen, which in the final effect leads to a quasi continuous distribution of the reams 12 to the packing machines. Therefore all normal conveying means which basically guarantee a division of the string 13 are suitable for carrying out the method according to the invention. This also applies in particular to the apparatus described in EP 03 09 0247 to which reference is made to its full extent, in which the divided centre, in other words the string in the area of the parting line, is displaced on-line in order to vary the division automatically.

The control itself can be implemented in various ways. For example, sensor elements can be arranged on the packing machines, which forward the respective state of the machine to the conveying means. In the simplest case the control can be implemented by an operator by actuating appropriate drives. A separate control system of higher ranking than the arrangement can also be used.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for conveying objects to apparatuses for further processing of the objects comprising:
    supplying strings of three or more objects, arranged side by side, in cycles to a conveyor;
    selectively dividing the string of each cycle into partial strings, wherein each partial string includes a variable number of objects; and
    conveying the partial strings by the conveyor simultaneously in different directions from one another.

2. The method according to claim 1, wherein the dividing step includes:
    controlling the conveyor to variably divide the string on-line for each cycle.

3. The method according to claim 1, wherein the conveyor includes conveying elements and wherein the conveying step includes:
    controlling the conveying elements to selectively convey the partial strings to one of respective apparatuses for further processing.

4. The method according to claim 1, wherein the dividing step includes:
    controlling the dividing of each string according to at least a load of each apparatus.

5. The method according to claim 1, further including:
    conveying the partial strings transversely to a direction in which the strings are supplied.

6. A conveying system for conveying objects from a production machine to apparatuses for further processing of the objects, comprising:
    a feeder to supply a string including three or more objects in cycles from the production machine to the apparatuses;
    a conveyor to selectively and variably divide the string into partial strings and convey the partial strings in opposite directions simultaneously to one of respective apparatuses; and
    a control unit to determine a number of objects in each partial string of each cycle.

7. The system according to claim 6, wherein the objects are disposed in the string without a substantial gap from one another.

8. The system according to claim 6, wherein the control unit is embodied as an integral component of the conveying system.

9. The system according to claim 6, wherein the control unit is embodied as a separate production control system.

10. The system according to claim 6, wherein the control unit is in functional connection with the conveyor.

11. An apparatus for conveying objects, comprising:
    a support element to supply a string of the objects in cycles in a supply direction; and
    conveyors to selectively and variably divide the string of each cycle into partial strings and transport the partial strings transversely to the supply direction, the conveyors including a transport plane and being driven independently of one another, wherein the conveyors are arranged in an idle position underneath the support element and are brought into contact with the objects to transport the partial strings in one of a first direction, a second direction, or simultaneously in first and second directions.

12. The apparatus according to claim 11, wherein each conveyor includes:
    at least two conveying elements, which are driven in pairs.

13. The apparatus according to claim 12, further including:
    contact elements disposed underneath the transport area to lift the conveying elements upward and out of the transport plane.

14. The apparatus according to claim 13, wherein the contact elements are individually triggerable and movable up and down perpendicular to the transport plane.

15. The apparatus according to claim 13, wherein each contact element includes:
    a sliding piece; and
    a pressure cylinder to move the sliding piece up and down.

16. The apparatus according to claim 12, wherein the conveying elements are arranged in segments, a number of segments in the transport area corresponding to at least a number of objects in each partial string to be transported.

17. The apparatus according to claim 16, wherein each segment includes:
    at least three contact elements.

18. The apparatus according to claim 17, wherein the contact elements of each segment, are triggerable synchronously for each conveyor.

19. The apparatus according to claim 17, wherein the contact elements are arranged in succession in each segment in the supply direction.

20. The apparatus according to claim 12, wherein the conveying elements of each conveyor are arranged at a distance from one another.

21. The apparatus according to claim 12, wherein the conveyors include first and second conveyors and wherein each conveying element of the first convey and each conveying element of the second conveyor are arranged in pairs, the pairs of the conveying elements being arranged at a distance from one another.

22. The apparatus according to claim 12, wherein each conveying element includes continuous, circulating conveyor belt.

23. The apparatus according to claim 12, wherein each conveying element includes a toothed belt.

* * * * *